(12) United States Patent
Katsuta (10) Patent No.: US 6,488,521 B2
(45) Date of Patent: Dec. 3, 2002

(54) CONNECTING MECHANISM OF CONNECTOR

(75) Inventor: Masao Katsuta, Taipei (CN)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 09/816,128

(22) Filed: Mar. 26, 2001

(65) Prior Publication Data

US 2001/0016440 A1 Aug. 23, 2001

Related U.S. Application Data

(63) Continuation of application No. PCT/JP99/01296, filed on Mar. 16, 1999.

(30) Foreign Application Priority Data

Sep. 25, 1998 (JP) .............................. 10-271450

(51) Int. Cl.$^7$ ............................................... H01R 13/15
(52) U.S. Cl. ...................................... 439/265; 439/660
(58) Field of Search ............................... 439/259, 265, 439/341, 660

(56) References Cited

U.S. PATENT DOCUMENTS

| | | | |
|---|---|---|---|
| 4,846,729 A | 7/1989 | Hikami, et al. | 439/161 |
| 4,952,162 A | 8/1990 | Hikami et al. | 439/161 |
| 5,059,133 A | 10/1991 | Hikami et al. | 439/161 |

FOREIGN PATENT DOCUMENTS

| | | |
|---|---|---|
| EP | 0260132 | 3/1988 |
| JP | 55-163783 | 12/1980 |
| JP | 62-150875 | 7/1987 |
| JP | 62-150875 | 9/1987 |
| JP | 63-69170 | 3/1988 |
| JP | 3-86569 | 4/1991 |
| JP | 6-76883 | 3/1994 |
| JP | 3-86569 | 9/1994 |
| JP | 10-41025 | 2/1998 |
| JP | 10041025 A | 2/1998 |

OTHER PUBLICATIONS

International Search Report dated Apr. 15, 1999.

*Primary Examiner*—Khiem Nguyen
(74) *Attorney, Agent, or Firm*—Armstrong, Westerman & Hattori, LLP

(57) ABSTRACT

It is an object to reduce a load given to connectors when the connectors are connected with each other in a connection mechanism composed of the main body side connector 20 and the base unit side connector 10 in which contact terminals of both the connectors are contacted with each other when the connectors are moved in the mutual direction. The base unit side contact terminal 12 is movably attached to the housing 11 of the base unit 10 so that the base unit side contact terminal 12 can be located at a non-contact position with respect to the contact terminal 22 of the main body side connector 20 at the first stage of engagement between the connectors 10, 20 and so that the base unit side contact terminal 12 can be located at a contact position with respect to the main body side connector 20 at the latter stage of engagement between the connectors 10, 20.

28 Claims, 5 Drawing Sheets

CONNECTING MECHANISM OF CONNECTOR

CROSS-REFERENCE TO RELATED APPLICATIONS

This application is based upon and claims priority of Japanese Patent Application No. Hei 10-271450, filed on Sep. 25, 1998, the contents being incorporated herein by reference, an a continuation of PCT/JP99/01296 filed Mar. 16, 1999.

TECHNICAL FIELD OF THE INVENTION

The present invention relates to a connecting mechanism of a connector. More particularly, the present invention relates to a connecting mechanism of a connector in which a load given to the connector in the process of connection can be reduced.

In many portable notebook personal computers, a CD-ROM drive unit or floppy disk drive unit, which is provided as an optional product, is arranged separately from a main body of the notebook personal computer and in a base unit. In this type of product, in general, connector-connection is made when the main body of the personal computer and the base unit are connected with each other. In order for a user to easily connect and disconnect the connector, when the main body is attached to the base unit, the connectors respectively mounted on the main body of the notebook personal computer and the base unit are connected with each other.

BACKGROUND OF THE INVENTION

Figure 1:
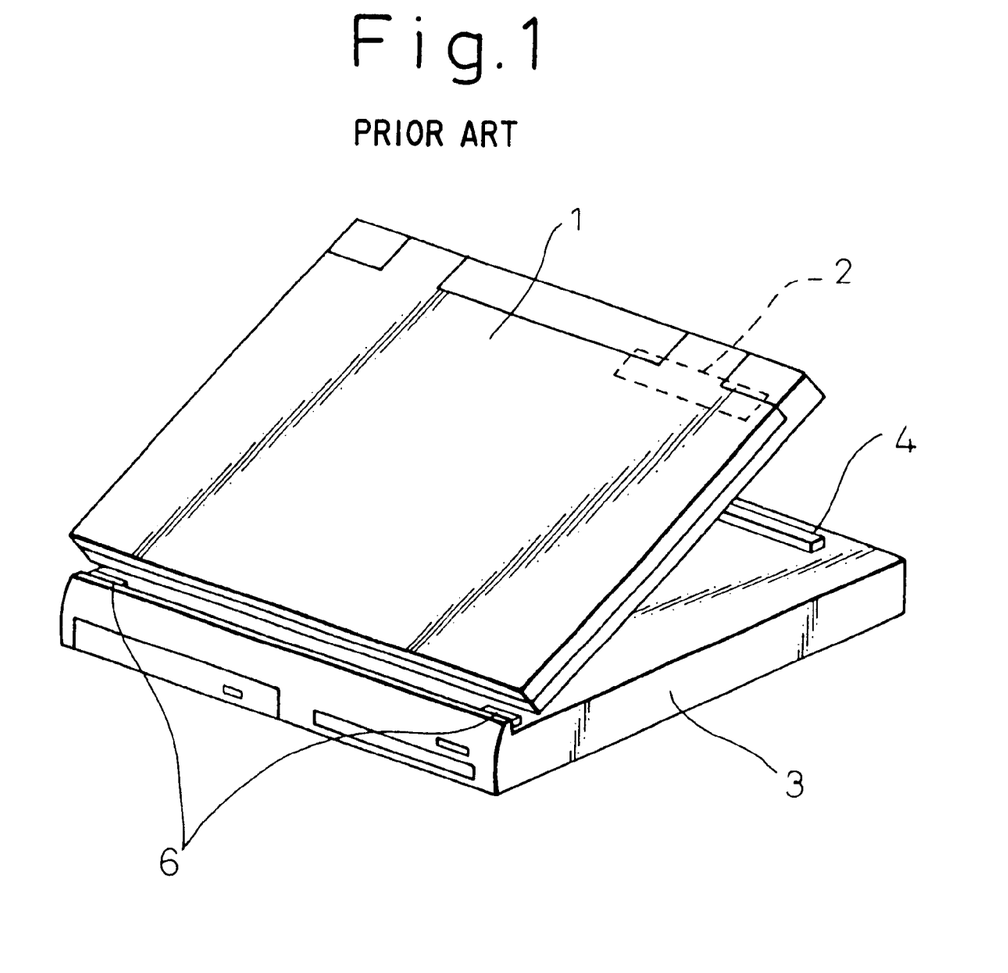
FIG. 1 is a view showing a conventional example in which a main body of a notebook personal computer is attached to a base unit as described before.
Figure 2:
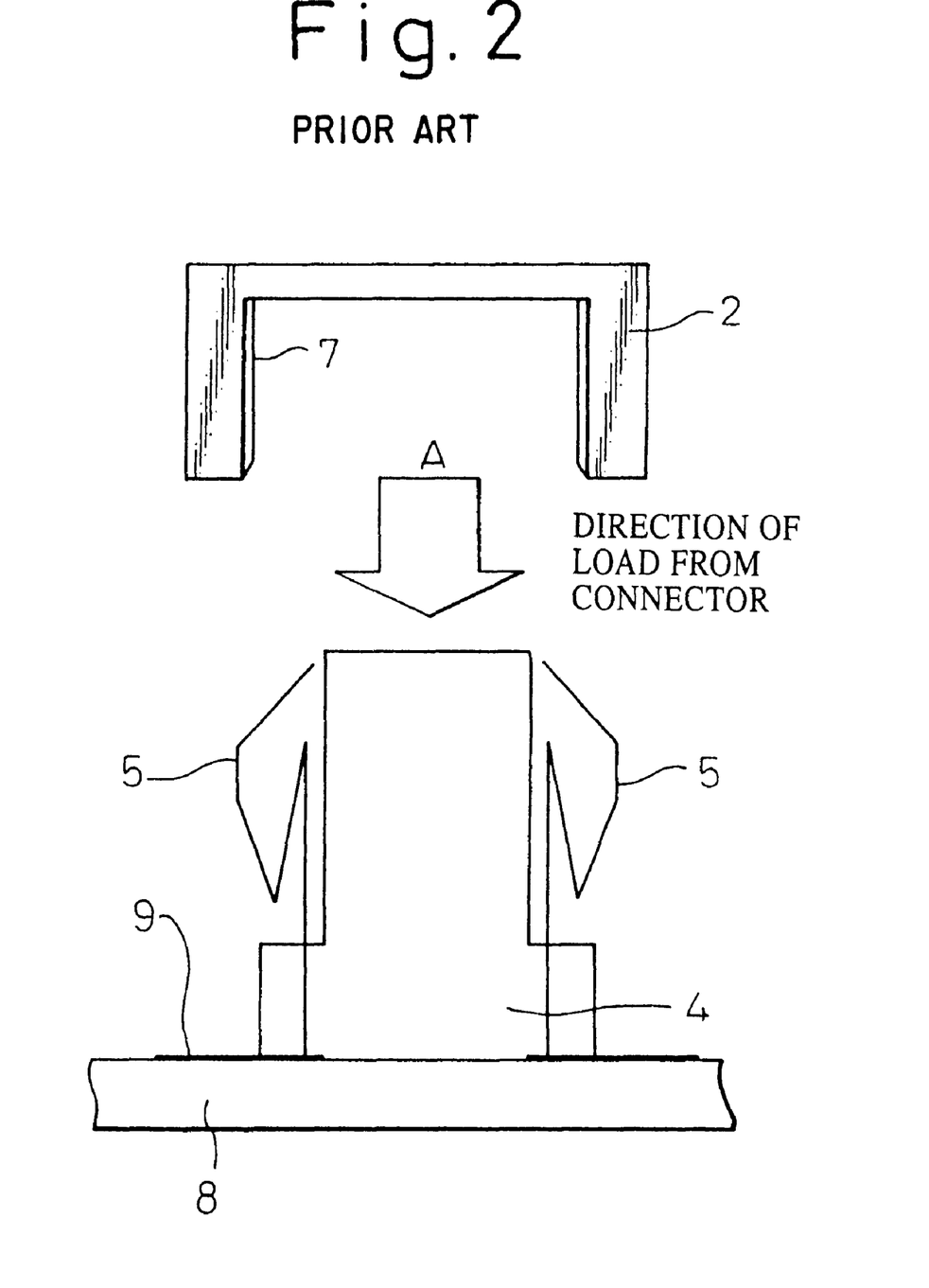
FIG. 2 is a cross-sectional view showing a connector structure of the conventional example.

FIG. 1 is a view showing a conventional example in which the main body of a notebook personal computer is incorporated into the base unit. FIG. 2 is a view showing a connecting mechanism of a connector of the conventional example. FIG. 1 shows an example in which the main body of the notebook personal computer is attached to the base unit which is a docking station. FIG. 2 is a cross-sectional view of the connector in the above conventional example.

In FIG. 1, the main body 1 of the portable notebook personal computer has a connector 2. The base unit 3 such as a CD-ROM drive unit or floppy disk drive unit also has a connector 4 at a position corresponding to the connector 2 of the main body so that the connector 4 can agree with the connector 2 when the main body 1 is attached to the base unit 3. The main body 1 of the personal computer is detachably attached to the base unit 3 at an appropriate positioning means 6 such as a groove or hook.

In order to attach the main body 1 of the personal computer to the base unit 3, the main body 1 of the personal computer is hooked at the base unit 3 by the positioning means 6, and when the main body 1 of the personal computer is rotated round this positioning means 6, the connector 2 arranged in the main body is engaged with the connector 4 arranged in the base unit.

In the case of engagement, as shown in FIG. 2, the connector 2 arranged in the main body is formed into a recessed profile, and the connector 4 arranged in the base unit is formed into a protruded profile. In the protruded portion of the connector 4, there is provided a contact terminal 5 made of spring steel. Accordingly, when the connector 2 arranged on the main body side is moved in a direction in which the connector 2 is engaged with the connector 4 on the base unit side, that is, when the connector 2 on the main body side is moved in the direction of arrow A, the contact terminals 7 of the connector 2 on the main body side come into contact with the contact terminals 5 of the connector 4 on the base unit side, In this moment, the contact terminals 5 are pushed inward to each other. In this connection, in FIG. 2, reference numeral 8 is a printed board on which the connector 4 is mounted, and reference numeral 9 is a wiring pattern connected with the contact terminals 5.

However, the following problems may be encountered in the conventional connector connection mechanism composed as described above.

1. Due to the fluctuation of the mounting position of each connector, when the connectors are connected with each other, it is difficult for the connector 2 on the main body side and the connector 4 on the bass unit side to be accurately positioned to each other. Since the engaging positions of the connector 2 on the main body side and the connector 4 on the base unit side cannot be made to agree exactly with each other, the contact terminals are damaged.

2. It is difficult to estimate the frequency of connecting motions, because it depends upon the use of the connector by a user. Therefore, in the case of a heavy user of the connector, there is a possibility that the frequency of connecting motions exceeds the guaranteed frequency of connecting motions even in the period in which the product is guaranteed by a manufacturer. For the above reasons, abrasion and damage are caused in the connecting terminal of the connector.

3. In order to position the main body, in many cases, positioning is conducted by positioning means arranged on the front face or back face of the apparatus. In the process of positioning, rattling is caused, and the engaging position of the connector is warped, which results in damage to the connecting terminal of the connector.

4. In proportion to the fluctuation of the connecting terminal of the connector in the manufacture, the engaging force of the connector fluctuates. Therefore, in some cases, an intensity of the engaging force is abnormally increased, and it becomes necessary for a user to give an extremely strong force to connect the connectors. For the above reasons, the connecting terminals of the connector may be given an extremely strong force and damaged.

5. The connector is used for supplying control signals and power to a file device or an external interface. Therefore, the number of terminals is increased. In accordance with the increase In the number of terminals, the connecting pressure is increased.

6. In order to solve the above problems mentioned in items 1 to 5, contact lubricant is coated on the terminals of the connector in a factory of a connector maker or in an assembling site of the connector. However, it is difficult to keep a quantity of contact lubricant constant in the process of coating. Therefore, the quantity of contact lubricant to be coated fluctuates according to a coating device. For the above reasons, the durability of the connectors fluctuates.

SUMMARY OF THE INVENTION

In order to accomplish the above object, the present invention provides a connecting mechanism of a connector comprising a first connector having a first contact terminal; and a second connector having a second contact terminal, wherein these connectors are engaged with each other when they are moved in the mutual direction, so that the first contact terminal and second contact terminal can be contacted with each other, and the first contact terminal is movably attached to a main body of the first connector so that the first contact terminal can be located at a non-contact position with respect to the second contact terminal at the first stage of engagement of the first connector with the second connector and also the first contact terminal can be located at a contact position with respect to the second contact terminal at the latter stage of engagement of the first connector with the second connector.

According to the present invention, the contact portion is given a load only at the latter stage of engagement between the connectors. Therefore, even if connectors having multiple pins are connected with each other, connection can be accomplished under a light load.

The first contact terminal is made of leaf spring material, and the first contact terminal is pushed by a spring force of the first contact terminal itself so that the first contact terminal can be located at a non-contact position when the first connector and the second connector are not engaged with each other. Due to the foregoing, the structure of the first contact terminal can be simplified.

At the latter stage of the engagement between the first connector and the second connector, a portion of the first contact terminal is pushed by a main body of the second connector when the first and the second connector are moved in the mutual direction, so that the first contact terminal can be moved toward the second contact terminal resisting a spring force and contacted with the second contact terminal.

The first contact terminal is attached to a housing of the first connector in such a manner that the first contact terminal is capable of rotating round a shaft, and the first contact terminal is pushed to a rotary position at which the first contact terminal is not contacted with the second contact terminal when the first connector and the second connector are not engaged with each other.

The first contact terminal is made of leaf spring material and pushed by a spring force of the first contact terminal itself to a rotary position which becomes a non-contact position when the first and the second connector are not engaged with each other.

The first contact terminal has a contact section on one side of the shaft and a base section on the other side, the contact section comes into contact with a wall section of the housing of the first connector parallel with the engaging direction when the first and the second connector are not engaged with each other, and the base section comes into contact with a wall section of the housing of the first connector perpendicular to the engaging direction.

The second connector comes into contact with neither the contact section of the first contact terminal nor the base section at the first stage of engagement between the first and the second connector, the second connector itself pushes the base section of the first contact terminal and rotates the first contact terminal round the shaft at the latter stage of engagement between the first and the second connector, so that the contact section of the first contact terminal is contacted with the second contact terminal of the second connector.

The first connector has a plurality of first contact terminals arranged at regular intervals, and the second connector has a plurality of second contact terminals arranged at regular intervals corresponding to the plurality of first contact terminals, The first connector is attached to a base unit, the second connector is detachably attached to the base unit, and the connecting mechanism of a connector is arranged in a main body of a notebook personal computer or other devices, A connecting mechanism of a connector comprises: a first connector having a pair of first contact terminals which are arranged symmetrically with each other; and a second connector having second contact terminals, the profiles of which are recessed, wherein the first and the second contact terminals are engaged and contacted with each other when they are moved in the mutual direction, and the pair of first contact terminals are movably attached to the first connector housing so that the pair of first contact terminals can be located at non-contact positions with respect to the second contact terminals at positions mutually close to each other at the first stage of engagement between the first and the second connector and so that the pair of first contact terminals can be located at contact positions with respect to the inside of the second recessed contact terminals at positions mutually separate outside each other at the latter stage of engagement between the first and the second connector.

The present invention provides a connecting mechanism of a first connector engaging with a second connector when the first connector is moved in the mutual direction with respect to the second connector, comprising a first contact terminal movably attached to the first connector so that the first contact terminal can be located at a non-contact position with respect to the second contact terminal of the second connector at the first stage of engagement between the first and the second connector and so that the first contact terminal can be located at a contact position with respect to the second contact terminal at the latter stage of engagement between he first and the second connector.

The present invention provides a connecting mechanism of a first connector engaging with a second connector when the first connector is moved in the mutual direction with respect to the second connector, comprising a pair of first contact terminals, which are arranged symmetrically with each other, movably attached to the housing of the first connector so that the first contact terminals can be located at non-contact positions with respect to the recessed second contact terminal of the second connector at positions close inside to each other at the first stage of engagement between the first and the second connector and so that the first contact terminals can be located at positions separate outside from each other and coming into contact with the inside of the recessed second contact terminal at the latter stage of engagement between the first and the second connector.

THE BEST MODE FOR CARRYING THE INVENTION

By referring to the appended drawings, an embodiment of the present invention will be explained in detail as follows.

In this embodiment, in an apparatus such as a notebook personal computer having an expansion unit such as a docking station as an option, there is provided a mechanism for moving a contact spring in a base side connector so that an excessive load is given to the contact spring.

Figure 3:
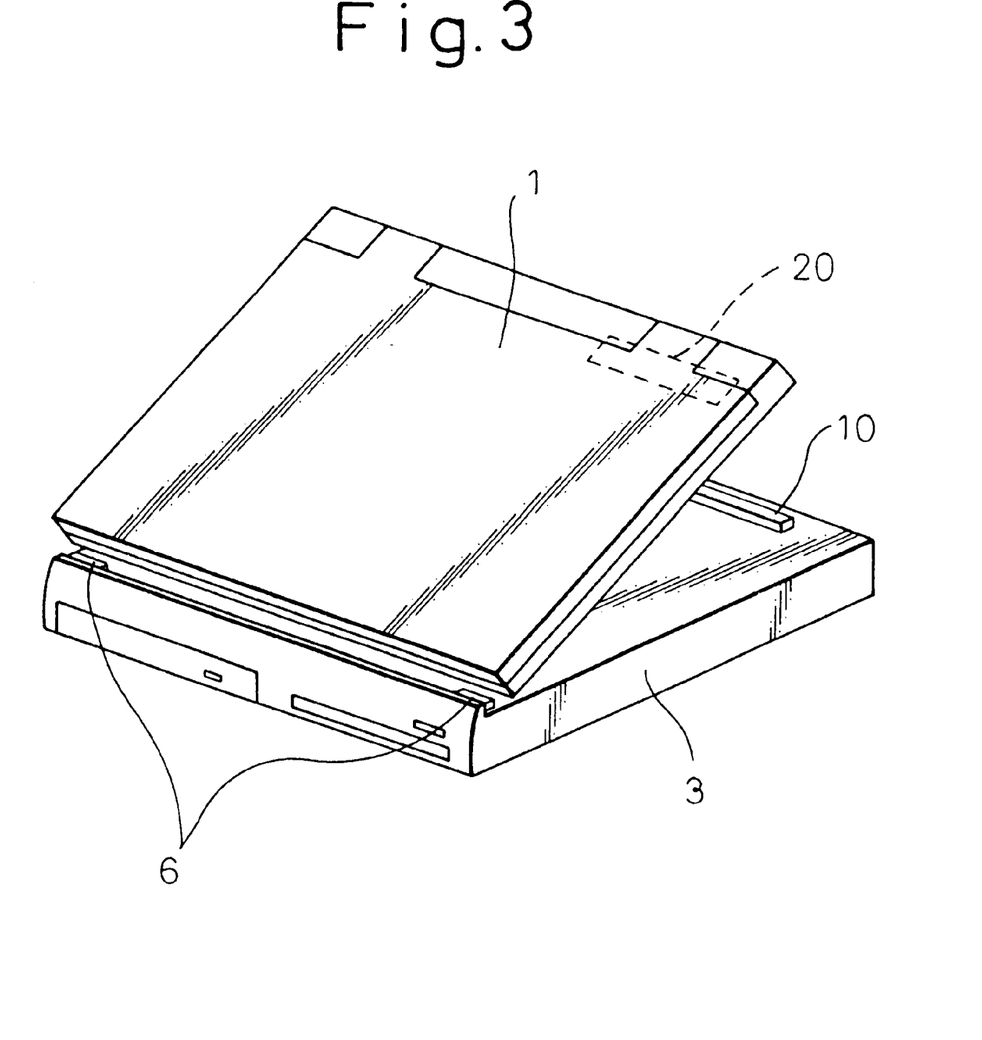
FIG. 3 is a view showing a main body and base unit in the case where the present invention is applied.

FIG. 3 is a view showing a portable notebook personal computer to which the present invention is applied. In the same manner as that of the conventional example, the main body 1 of the personal computer has a connector 20. In the same manner as that of the conventional example, the bass unit 3 such as a CD-ROM drive unit or floppy disk drive unit has a connector 10 at a position corresponding to the connector 20 on the main body side when the main body 1 is attached to the bass unit 3. In the same manner as that of the conventional example, the main body 1 of the personal computer is detachably attached to the base unit 3 being positioned by an appropriate positioning means 6 such as a groove or hook.

Figure 4:
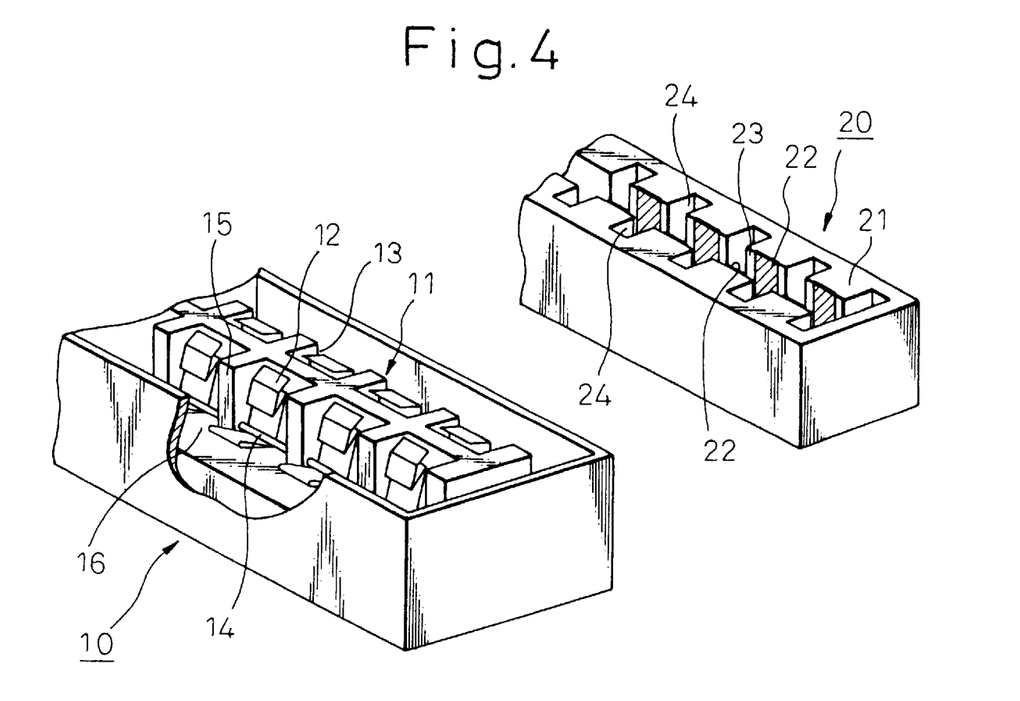
FIG. 4 is a perspective view showing the connectors of the base unit side and the main body side of the present invention.
Figure 5:
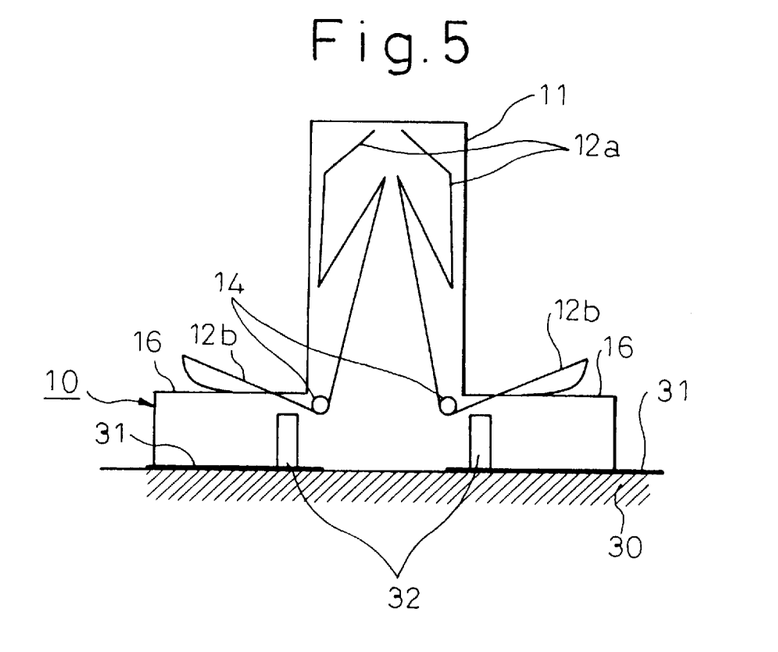
FIG. 5 is a view showing a state of non-engagement of the base unit side connector of the present invention.
Figure 6:
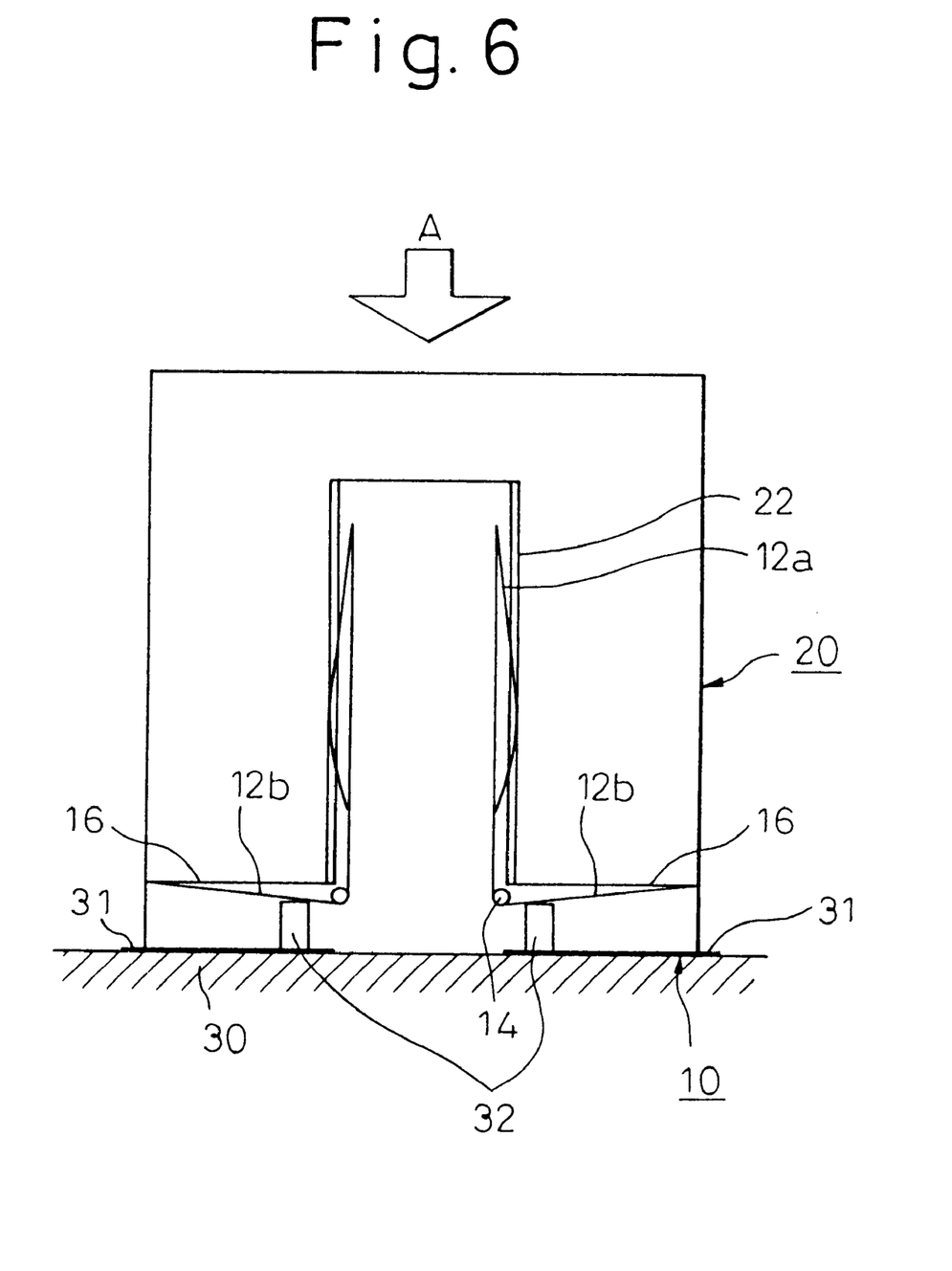
FIG. 6 is a view showing a state in which the base unit side connector of the present invention is engaged with the main body side connector.

FIG. 4 is a view showing an embodiment of the main body side connector 20 and the base unit side connector 10 of the present invention. FIG. 5 is a view showing a base unit side connector 10 in the case of non-engagement. FIG. 6 is a view showing a state in which the main body side connector 20 is engaged with the base unit side connector 10.

The base unit side connector 10 includes a housing 11 made of insulating material. In this housing 11, pairs of the contact terminals 12 are arranged in the longitudinal direction at regular intervals. These contact terminals 12 are made of leaf spring material. In pairs of recess sections 13 which are formed in the housing 11 in the longitudinal direction at regular intervals, these contact terminals 12 are arranged. These contact terminals 12 are respectively attached by means of calking to a pair of shafts 14 made of insulating material extending in the longitudinal direction.

On the other hand, the connector 20 on the main body side includes a housing 21. Corresponding to the contact terminals 12 of the base unit side connector, the recess-shaped contact terminals 22 are arranged in the longitudinal direction at regular intervals. In the housing 21, the small recess 23 in which the recess-shaped contact terminal 22 is formed and the large recess 24 in which the contact terminal 22 is not formed are alternatively arranged. The small recess 23, in which the contact terminal 22 is formed, corresponds to a pair of contact terminals 12 of the connector housing on the base unit side, and the large recess 24 corresponds to the partition wall section 15 of the connector housing on the base unit side.

Accordingly, in the case where the connector 20 of the main body 1 of a personal computer and so forth is engaged with the connector 10 of the base unit 3, as shown in FIG. 3, the positioning section 6 of the main body 1 is hooked at the bass unit 3, and the main body 1 of the personal computer is rotated around this positioning section 6, so that the connector 20 on the main body side comes to be engaged with the connector 10 on the base unit side. In this case, the large recess section 24 of the connector 20 on the main body side is engaged with the partition wall section 15 of the connector housing on the base unit side.

In FIGS. 4 and 5, an upper portion (contact portion 12a) of the contact terminal 12 with respect to the shaft 14 is extended upward from the shaft 14 and bent downward outside and then bent upward again, so that the contact section 12a is formed. The leaf spring section 12b of the contact terminal 12, which is located on the opposite side to the contact section 12a with respect to the shaft 14, is laterally extended outside and bent downward. This bent portion comes into contact with the horizontal section 16 of the housing 11. Due to the load given by this bent portion, the contact section 12a is set inside the recess section 13 of the housing 11.

When the connector 20 on the main body side is engaged with the connector 10 on the base unit side, connection is accomplished as follows. While the connectors 10, 20 are being moved in direction A so that both the connectors can approach each other, at the first stage of engagement, under the condition that the contact terminal 22 formed in the recess section 23 of the main body side connector is not contacted with the contact terminal 12 which is set inside the recess section 13 of the housing 11, the connectors are engaged with each other. At the latter stage of engagement, as shown in FIG. 6, when a forward end face of the housing 21 of the m body side connector 20 comes into contact with the leaf spring section 12b of the contact terminal 12, the contact section 12a of the contact terminal 12 is moved outside while being rotated round the shaft 14, so that the contact section 12a of the contact terminal 12 tries to move out of the recess section 13. (Stopper 32 prevents rotation of contact terminal 12 beyond a certain position, as shown in FIG. 6.) Therefore, the contact section 12a of the contact terminal 12 comes into contact with the contact terminal 22 formed in the recess section 23 of the main body side connector.

A pair of terminals 16 for contact use are embedded in the housing 11 on the base unit aide. Therefore, when the contact terminal 12 is rotated around the abaft 14 when the connectors are engaged with each other a pair of contact terminals 12 themselves come into contact with the pair of terminals 16 respectively for contact use. These terminals 16 for contact use are connected with the wiring pattern 31 on the printed board 30.

Referring to the drawings, a detailed explanation has been made for the case in which the connector of the main body of the portable notebook personal computer, which is an embodiment of the present invention, is engaged with the connector of the base unit. However, it should be noted that the present invention is not limited to the above specific embodiment. Of course, variations of connection between various connectors may be made by one skilled in the art without departing from the spirit and scope of the present invention.

INDUSTRIAL APPLICABILITY OF THE INVENTION

As explained above, according to the present invention, the mechanism for moving the contact terminals is provided in the connector on the base unit side, and the contact terminals made of leaf spring material come into contact with the contact terminals on the main body side only when the connectors are perfectly engaged with each other. Therefore, it is possible to prevent the contact terminals of the connector from being given an excessively heavy load when the connectors are connected with each other. Also, it is possible to prevent the occurrence of fluctuation of the engaging force in the case of contact of the contact terminals which is caused by fluctuation in the process of manufacturing the contact terminals. Even if the connector is shifted a little from a predetermined position, there is no possibility that a force sufficient to damage the connector contact terminal is applied. Accordingly, it is possible to prevent the contact terminals from being damaged. Further, it is possible to reduce an intensity of the engaging force necessary for connection even if the number of the connector terminals is large.

What is claimed is:

1. A connecting mechanism of a connector comprising: a first connector having a first contact terminal; and a second connector having a second contact terminal, wherein these connectors are engaged with each other when they are moved in the mutual direction, so that the first contact terminal and second contact terminal can be contacted with each other, and the first contact terminal is movably attached to a main body of the first connector, so that the first contact terminal can be located at a non-contact position with respect to the second contact terminal at a first stage of engagement of the first connector with the second connector and also the first contact terminal can be located at a contact position with respect to the second contact terminal at a latter stage of engagement of the first connector with the second connector, wherein the connecting mechanism further comprises a shaft, and the first contact terminal is attached to a housing of the first connector in such a manner that the first contact terminal is capable of rotating around the shaft, and the first contact terminal is pushed to a rotary position at which the first contact terminal is not contacted with the second contact terminal when the first connector and the second connector are not engaged with each other.

2. A connecting mechanist of a connector according to claim 1, wherein the first contact terminal is made of leaf spring material and pushed by a spring force of the first contact terminal itself to a rotary position which becomes a non-contact position when the first and the second connector are not engaged with each other.

3. A connecting mechanism of a connector according to claim 1, wherein the first contact terminal has a contact section on one side of the shaft and a base section on the other side, the contact section comes into contact with a wall section of the housing of the first connector parallel to an engaging direction when the first and the second connectors are not engaged with each other, and the base section comes into contact with a wall section of the housing of the first connector perpendicular to the engaging direction.

4. A connecting mechanism of a connector according to claim 3, wherein the second connector comes into contact with neither the contact section of the first contact terminal nor the base section at the first stage of engagement between the first and the second connector, the second connector itself pushes the base section of the first contact terminal and rotates the first contact terminal around the shaft at the latter stage of engagement between the first and the second connector, so that the contact section of the first contact terminal is contacted with the second contact terminal of the second connector.

5. A connecting mechanism of a connector comprising: a first connector having a pair of first contact terminals which are arranged symmetrically with each other; and a second connector having second contact terminals, the profiles of which are recessed, wherein the first and the second contact terminals are engaged and contacted with each other when they are moved in the mutual direction, and the pair of first contact terminals are movably attached to the first connector housing so that the pair of first contact terminals can be located at non-contact positions with respect to the second contact terminals at positions mutually close to each other at the first stage of engagement between the first and the second connector and so that the pair of first contact terminals can be located at contact positions with respect to the inside of the second recessed contact terminals at positions mutually separated from each other at the latter stage of engagement between the first and the second connector.

6. A connecting mechanism of a first connector engaging with a second connector when the first connector is moved in the mutual direction with respect to the second connector, comprising a first contact terminal movably attached to the first connector so that the first contact terminal can be located at a non-contact position with respect to the second contact terminal of the second connector at the first stage of engagement between the first and the second connector and so that the first contact terminal can be located at a contact position with respect to the second contact terminal at the latter stage of engagement between the first and the second connector, wherein the connecting mechanism further comprises a shaft, and the first contact terminal is attached to a housing of the first connector in such a manner that the first contact terminal can be rotated round the shaft, and the first contact terminal is pushed to a rotary position which becomes a non-contact position when the first and the second connector are not engaged with each other.

7. A connecting mechanism of a first connector according to claim 6, wherein the first contact terminal is made of leaf spring material and is pushed by a spring force of the first contact terminal itself to a rotary position which becomes a non-contact position when the first and the second connector are not engaged with each other.

8. A connecting mechanism of a first connector according to claim 6, wherein the first contact terminal has a contact section on one side of the shaft and a base section on the other side, the contact section comes into contact with a wall section of the housing of the first connector parallel with the engaging direction when the first and the second connector are not engaged with each other, and the base section comes into contact with a wall section of the housing of the first connector perpendicular to the engaging direction.

9. A connecting mechanism of a first connector according to claim 8, wherein the second connector comes into contact with neither the contact section of the first contact terminal nor the base section at the first stage of engagement between the first and the second connector, the second connector itself pushes the base section of the first contact terminal and rotates the first contact terminal round the shaft at the latter stage of engagement between the first and the second connector, so that the contact section of the first contact terminal is contacted with the second contact terminal of the second connector.

10. A connecting mechanism of a first connector engaging with a second connector when the first connector is moved in the mutual direction with respect to the second connector, comprising a pair of first contact terminals, which are arranged symmetrically with each other, movably attached to the housing of the first connector so that the first contact terminals can be located at non-contact positions with respect to the recessed second contact terminal of the second connector at positions close inside to each other at the first stage of engagement between the first and the second connector and so that the first contact terminals can be located at positions separate outside from each other and coming into contact with the inside of the recessed second contact terminal at the latter stage of engagement between the first and the second connector.

11. A connecting mechanism of a connector according to claim 5, wherein the first contact terminal is made of leaf spring material, and the first contact terminal is pushed by a spring force of the first contact terminal itself so that the first contact terminal can be located at a non-contact position when the first connector and the second connector are not engaged with each other.

12. A connecting mechanism of a connector according to claim 11, wherein at the latter stage of the engagement between the first connector and the second connector, a portion of the first contact terminal is pushed by a main body of the second connector when the first and the second connector are moved in the mutual direction, so that the first contact terminal can be moved toward the second contact terminal resisting a spring force and contacted with the second contact terminal.

13. A connecting mechanism of a connector according to claim 5, wherein the first contact terminal is attached to a housing of the first connector in such a manner that the first contact terminal is capable of rotating around a shaft, and the first contact terminal is pushed to a rotary position at which the first contact terminal is not contacted with the second contact terminal when the first connector and the second connector are not engaged with each other.

14. A connecting mechanism of a connector according to claim 13, wherein the first contact terminal is made of leaf spring material and pushed by a spring force of the first contact terminal itself to a rotary position which becomes a non-contact position when the first and the second connector are not engaged with each other.

15. A connecting mechanism of a connector according to claim 13, wherein the first contact terminal has a contact section on one side of the shaft and a base section on the other side, the contact section comes into contact with a wall section of the housing of the first connector parallel to an engaging direction when the first and the second connectors are not engaged with each other, and the base section comes into contact with a wall section of the housing of the first connector perpendicular to the engaging direction.

16. A connecting mechanism of a connector according to claim 15, wherein the second connector comes into contact with neither the contact section of the first contact terminal nor the base section at the first stage of engagement between the first and the second connector, the second connector itself pushes the base section of the first contact terminal and rotates the first contact terminal around the shaft at the latter stage of engagement between the first and the second connector, so that the contact section of the first contact terminal is contacted with the second contact terminal of the second connector.

17. A connecting mechanism of a connector according to claim 5, wherein the first connector has a plurality of first contact terminals arranged at regular intervals, and the second connector has a plurality of second contact terminals arranged at regular intervals corresponding to the plurality of first contact terminals.

18. A connecting mechanism of a connector according to claim 5, wherein the first connector is attached to a base unit, the second connector is detachably attached to the base unit, and the connecting mechanism of a connector is arranged in a main body of a notebook personal computer and others.

19. A connecting mechanism of a first connector according to claim 10, wherein the first contact terminal is made of leaf spring material and pushed by a spring force of the first contact terminal itself to a non-contact position when the first and the second connector are not engaged with each other.

20. A connecting mechanism of a first connector according to claim 19, wherein a portion of the first contact terminal is pushed by the second connector itself when the first and the second connector are moved in the mutual direction at the latter stage of engagement between the first and the second connector, so that the first contact terminal is moved to and contacted with the second contact terminal, resisting a spring force.

21. A connecting mechanism of a first connector according to claim 20, wherein the first contact terminal is attached to a housing of the first connector in such a manner that the first contact terminal can be rotated round a shaft, and the first contact terminal is pushed to a rotary position which becomes a non-contact position when the first and the second connector are not engaged with each other.

22. A connecting mechanism of a first connector according to claim 21, wherein the first contact terminal is made of leaf spring material and is pushed by a spring force of the first contact terminal itself to a rotary position which becomes a non-contact position when the first and the second connector are not engaged with each other.

23. A connecting mechanism of a first connector according to claim 21, wherein the first contact terminal has a contact section on one side of the shaft and a base section on the other side, the contact section comes into contact with a wall section of the housing of the first connector parallel with the engaging direction when the first and the second connector are not engaged with each other, and the base section comes into contact wit a wall section of the housing of the first connector perpendicular to the engaging direction.

24. A connecting mechanism of a first connector according to claim 22, wherein the second connector comes into contact with neither the contact section of the first contact terminal nor the base section at the first stage of engagement between the first and the second connector, the second connector itself pushes the base section of the first contact terminal and rotates the first contact terminal round the shaft at the latter stage of engagement between the first and the second connector, so that the contact section of the it contact terminal is contacted with the second contact terminal of the second connector.

25. A connecting mechanism of a first connector according to claim 10, wherein the first connector has a plurality of first contact terminals arranged at regular intervals, and the second connector has a plurality of second contact terminals arranged at regular intervals corresponding to the plurality of first contact terminals.

26. A connecting mechanism of a first connector according to claim 10, wherein the first connector is attached to a base unit, the second connector is detachably attached to the base unit, and the connecting mechanism of a connector is arranged in a main body of a notebook personal computer and others.

27. A connecting mechanism of a connector according to claim 5, wherein each of the first contact terminals are made of leaf spring material attached to a housing of the first connector in such a manner that the first contact terminals are capable of rotating around respective shafts, arranged parallel to each other, each of the first contact terminals having a contact section on one side of the shaft and a base section on the other side:

the contact sections coming inward with respect to each other into contact with wall sections of the housing of the first connector parallel to an engaging direction when the first and the second connectors are not engaged with each other; and the second connector itself pushing the base sections of the first contact terminals and rotating the first contact terminals around the shafts at the latter stage of engagement between the first and the second connectors, so that the contact sections of the first contact terminal come outward with respect to each other to be in contact with the second contact terminals of the second connector.

28. A connecting mechanism of a first connector according to claim 10, wherein each of the first contact terminals are made of leaf spring material attached to a housing of the first connector in such a manner that the first contact terminals can be rotated around shafts arranged parallel to each other, each of the first contact terminals having a contact section on one side of the shaft and a base section on the other side;

the contact sections coming inward with respect to each other into contact with wall sections of the housing of the first connector parallel with the engaging direction when the first and the second connector are not engaged with each other; and the second connector itself pushing the base sections of the first contact terminals and rotating the first contact terminals round the shafts at the latter stage of engagement between the first and the second connectors, so that the contact sections of the first contact terminals come outward with respect to each other to be in contact with the second contact terminals of the second connector.

* * * * *